United States Patent [19]

Saruwatari et al.

[11] Patent Number: 5,233,011
[45] Date of Patent: Aug. 3, 1993

[54] PROCESS FOR PREPARING INSULATED WIRE

[75] Inventors: Masumi Saruwatari, Nagoya; Shoichi Tsuji, Tanashi; Masami Nakano, Midori; Shinobu Moriya, Nagoya; Masahiro Ohta; Toshiyuki Nakakura, both of Yokohama, all of Japan

[73] Assignee: Mitsui Toatsu Chemicals, Incorporated, Tokyo, Japan

[21] Appl. No.: 838,392

[22] Filed: Feb. 18, 1992

Related U.S. Application Data

[62] Division of Ser. No. 422,897, Oct. 17, 1989.

[30] Foreign Application Priority Data

Oct. 20, 1988 [JP]  Japan .................................. 63-262711

[51] Int. Cl.$^5$ .............................................. C08G 18/30

[52] U.S. Cl. ...................................... 528/73; 427/117; 427/120

[58] Field of Search ................... 528/73; 427/117, 120

[56] References Cited

U.S. PATENT DOCUMENTS 4,737,304  4/1988  Vo Dink et al. ....................... 528/73

Primary Examiner—Maurice J. Welsh
Attorney, Agent, or Firm—Burns, Doane, Swecker & Mathis

[57] ABSTRACT

An insulated wire having excellent thermal resistance and good surface appearance is obtained by coating a condutor with a specific polyimide in a temperature range of 300° C. to 450° C. and controlling moisture content to 200 ppm or less.

11 Claims, No Drawings

PROCESS FOR PREPARING INSULATED WIRE

This application is a divisional of application Ser. No. 07/422,897, filed Oct. 17, 1989.

BACKGROUND OF THE INVENTION

1. Field of the Invention

The present invention relates to an insulated wire using a specific polyimide as the insulator and a process for the production of the insulated wire.

2. Prior Art of the Invention

Recent years have seen dramatic developments in the electrical and electronic industry. In particular, apparatus used in the industry have become smaller and lighter in weight, and hence, more excellent heat resistance is desired for machine parts and insulating materials.

Aromatic polyimide has excellent mechanical properties, solvent resistance and electrical insulative properties in addition to the highest thermal resistance among organic polymers. Examples of the aromatic polyimide are a polyimide prepared from bis(4-aminophenyl) ether and pyromellitic dianhydride (KAPTON,VESPEL; a product of E.I. Du Pont de Nemours & Co.) and a polyimide prepared from bis(4-aminophenyl) ether and 3,3',4,4'-biphenyltetracarboxylic dianhydride (UBILEX; a product of Ube Industries Co.).

Since heat-melting is difficult in these polyimides, it is difficult to produce an insulated wire by a melt-extrusion process.

SUMMARY OF THE INVENTION

An object of this invention is to provide an insulated wire comprising a specific polyimide which can be processed by melt-extrusion and is also excellent in thermal resistance.

Another object of this invention is to provide a process for the production of an insulated wire covered with a specific polyimide having thermal resistance.

The present inventors have carried out an intensive investigation in order to achieve the above objects. As a result, it has been found that the insulated wire covered with polyimide having excellent thermal resistance can be obtained by a melt-extrusion process. Thus the invention has been completed.

One aspect of this invention is an insulated wire consisting of a conductor and an insulator covering said conductor, said insulator being comprised of at least one polyimide having recurring structural units represented by the formula(I)

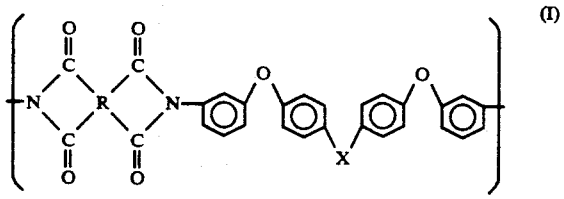

wherein R is a tetravalent radical selected from the group consisting of an aliphatic radical having two or more carbon atoms, a cyclo-aliphatic radical, a monoaromatic radical, a condensed polyaromatic radical and a non-condensed polyaromatic radical wherein the aromatic radicals are mutually connected with a bond or a crosslinking function, X is a divalent group of a single bond, sulfur atom, sulfonyl radical, carbonyl radical, isopropylidene radical, or hexafluoroisopropylidene radical.

A further aspect of this invention is a production process for insulated wire.

R is preferably a tetravalent radical selected from the group consisting of

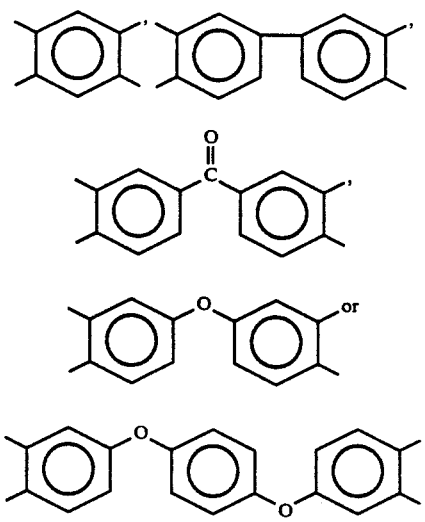

According to this invention, an insulated wire having excellent heat resistance, good surface appearance and high dielectric strength in water is obtained by coating a conductor with polyimide that has been heated to a temperature range in the range of 300° C. to 450 ° C. and by controlling the moisture content of the polyimide to 200ppm or less.

The insulated wire can be prepared from the specific polyimide by melt extrusion process, having excellent thermal resistance and good insulation.

DETAILED DESCRIPTION OF THE INVENTION

The polyimide of this invention can be prepared by conducting a dehydration condensation reaction of an aromatic tetracarboxylic dianhydride with an aromatic diamine.

Exemplary aromatic tetracarboxylic dianhydrides which may be used to prepare the polyimide include, pyromellitic dianhydride, ethanetetracarboxylic dianhydride,
butanetetracarboxylic dianhydride,
cyclopentanetetracarboxylic dianhydride,
1,2,3,4-benzenetetracarboxylic dianhydride,
2,3,6,7-naphthalenetetracarboxylic dianhydride,
1,4,5,8-naphthalenetetracarboxylic dianhydride,
1,2,5,6-naphthalenetetracarboxylic dianhydride,
3,4,9,10-perylenetetracarboxylic dianhydride,
2,3,6,7-anthracenetetracarboxylic dianhydride,
1,2,7,8-phenanthrenetetracarboxylic dianhydride, 3,3',4,4'-biphenyltetracarboxylic dianhydride,
2,2',3,3'-biphenyltetracarboxylic dianhydride,
3,3',4,4'-benzophenonetetracarboxylic dianhydride,
2,2',3,3'-benzophenonetetracarboxylic dianhydride,
2,2-bis(3,4-dicarboxyphenyl)propane dianhydride,
2,2-bis(2,3-dicarboxyphenyl)propane dianhydride,
bis(3,4-dicarboxyphenyl)ether dianhydride,
bis(2,3-dicarboxyphenyl)ether dianhydride, bis(3,4-dicarboxyphenyl)sulfone dianhydride,
bis(2,3-dicarboxyphenyl)sulfone dianhydride,
2,2-bis(3,4-dicarboxyphenyl)-1,1,1,3,3,3-hexafluoropropane dianhydride,
2,2-bis(3,4-dicarboxyphenyl)-1,1,1,3,3,3-hexachloropropane dianhydride,
1,1-bis(2,3-dicarboxyphenyl)ethane dianhydride,
bis(2,3-dicarboxyphenyl)methane dianhydride,
bis(3,4-dicarboxypenyl)methane dianhydride,
4,4'-(p-phenylenedioxy)diphthalic dianhydride and
4,4'-(m-phenylenedioxy)diphthalic dianhydride.

The preferred aromatic tetracarboxylic dianhydride used is pyromellitic dianhydride, 3,3',4,4'-biphenyltetracarboxylic dianhydride, 3,3',4,4'-benzophenonetetracarboxylic dianhydride, bis(3,4-dicarboxyphenyl)ether dianhydride and 4,4'-(p-phenylenedioxy)diphthalic dianhydride.

The aromatic tetracarboxylic dianhydride may be used singly or in combinations of two or more.

Exemplary aromatic diamines suitable for use include 4,4'-bis(3-aminophenoxy)biphenyl,
bis[4-(3-aminophenoxy)phenyl]sulfide,
bis[4-(3-aminophenoxy)phenyl]sulfone,
bis[4-(3-aminophenoxy)phenyl]ketone,
2,2-bis[4-(3-aminophenoxy)phenyl]propane and
2,2-bis[4-(3-aminophenoxy)phenyl]-1,1,1,3,3,3-hexafluoropropane,
these compounds may be used singly or in combination.

Other aromatic diamines may also be used as aromatic diamine ingredients by replacing a part of the above aromatic diamine. The amount of diamine to be replaced is less than 20 % by mole per mole of the total aromatic diamine.

Exemplary other aromatic diamines include, p-phenylenediamine, m-phenylenediamine, m-aminobenzylamine, p-aminobenzylamine, 4,4'-diaminobiphenyl, 3,3'-diaminobiphenyl, 3,3'-diaminodiphenyl ether, 4,4'-diaminodiphenyl ether, 4,4'-diaminodiphenyl methane, 3,3'-diaminodiphenyl methane, 1,1-bis(4-aminophenyl)ethane, 1,1-bis(3-aminophenyl)ethane, 2,2-bis(3-aminophenyl)propane, 2,2-bis(4-aminophenyl)propane, 2,2-bis(4-aminophenyl)-1,1,1,3,3,3-hexafluoropropane, 2,2-bis(3-aminophenyl)-1,1,1,3,3,3-hexafluoropropane, 3,3'-diaminodiphenyl sulfide, 4,4'-diaminodiphenyl sulfide, 3,3'-diaminodiphenyl sulfone, 4,4'-diaminodiphenyl sulfone and 3,3'-diaminobenzophenone.

A polyimide used in the invention can be prepared usually by suspending or dissolving the aromatic tetracarboxylic acid dianhydride and the aromatic diamine in an organic solvent and conducting a dehydration condensation reaction. The resulting product is separated and purified by commercial methods to obtain polyimide powder. The reaction of an aromatic tetracarboxylic acid dianhydride with an aromatic diamine may be also carried out in the absence of a organic solvent.

The polyimide powder can be charged into a processing step as such or after being processed into granules.

The conductor of this invention is preferably a metal element or an alloy having a specific resistance of $20 \times 10^{-6}$ Ω cm or less. Illustrative metal elements which may be used include, for example, zinc, aluminum, gold, silver, copper, iron, nickel and niobium. Aluminum and copper are preferably used. Exemplary alloys which may be mentioned include, for example, copper alloys containing 2% or less of metal elements such as silver, chromium zirconium, tin, lead, tellurium, cadmium and beryllium; aluminum alloys containing 2% or less of metal elements such as magnesium, silicon, iron and zirconium; and niobium alloys containing metal elements such as titanium, zirconium, tantalum, tin and germanium.

The conductor for use in the present invention may be coated with a metal film in order to prevent increases in the specific resistance of the conductor, heat evolution of the conductor and reduction in voltage due to oxidative deterioration of the above noted coated conductor. Illustrative conductors are those deposited with tin, zinc, nickel, silver, aluminum, solder and copper.

The size of the conductor for use in this invention is preferably in the range of 0.001 to 2000 $mm^2$ in cross-sectional area. When the cross-sectional area of the conductor is less than 0.001 $mm^2$, the conductor unfavorably tends to break in the production and handling step. On the other hand, when the cross-sectional area exceeds 2000 $mm^2$, this leads to high stiffness of the conductor and handling becomes difficult.

The conductor of this invention is exposed to higher temperatures in the melt-extrusion step as compared with conventional melt-extrusion processes, and hence is subjected to a faster rate of oxidation. Accordingly, it is particularly preferred to use a conductor coated with nickel or silver.

The polyimide used in this invention can be heat-melted with known melt-extrusion equipment to cover the conductor by passing the conductor through a covering die represented by a cross-head die, and cooling to obtain the insulated wire of this invention.

Polyimide of this invention is stored in the form of powder or pellets and contains from 0.5 to 1.0% of moisture in usual storage conditions. Such level of moisture content causes no trouble when articles are prepared by injection molding. However, it has been found that the moisture gives adverse effects on the characteristics covering insulator when the insulated wire is produced melt-extrusion process of this invention.

That is, the moisture content of 0.5 to 1% leads to problems particularly on the appearance and dielectric strength in water of the insulated wire.

By controlling the moisture content to 200 ppm or less, it has been succeeded in the stable production of the insulated wire having excellent properties.

Any method may be used for reducing the moisture content to 200 ppm or less. The powder or pellets generally kept for 3 to 24 hours in the temperature range from 100° C. to a temperature where polyimide does not fuse, usually 250° C. or less. Moisture reduction may also be effectively conducted in a nitrogen atomosphere and/or under reduced pressure.

Melt-extrusion temperature varies depending upon the polymer structure and is usually in the range of 300° to 450° C., preferably in the range of 350° to 430° C. When the temperature is lower than 300° C., the polyimide resin cannot be fused and hence extrusion is impossible. On the other hand, when the temperature exceeds 450° C. the polyimide resin tends to decompose and its function as the insulator is impaired by the generation of bubbles and decomposition residue.

The thickness of the insulator on the conductor of this invention is preferably in the range of 0.01 to 5 mm, when the thickness is less than 0.01 mm, it is unfavorable because wide fluctuations are found in the thickness of the insulator and electrical defects such as pin holes ocurr. On the other hand, when the thickness of the insulator exceeds 5 mm difficulties in handling ocurr, such as in bending operation of the insulated wire.

The present invention will hereinafter be illustrated further in detail by way of examples.

Characteristic values of polyimide indicated in the examples were measured by the following methods.

(1) Glass transition temperature and melting point:

Glass transition temperature (Tg) and melting point (Tm) were measured in accordance with DSC method. Tm was defined as the peak temperature of a fusion curve.

(2) Melt viscosity:

Melt viscosity was measured with a KOKA-model flow tester. Apparent viscosity (poise) was calculated at an apparent shear rate of 200 sec$^{-1}$ and at temperature of 400° C.

(3) Dielectric strength in water:

Dielectric strength test was conducted in water at 20° C. with 60 Hz AC power at a step-up rate of 1000 V/min. in accordance with JIS C3005.

Polyimide 1

Into a reaction vessel equipped with a stirrer, reflux condenser and nitrogen inlet tube, 368.4 g(1 mole) of 4,4'-bis(3-aminophenoxy)biphenyl and 2344 g of N,N-dimethylacetamide were charged. To the resulting solution, 218.1 g(1 mole) of pyromellitic dianhydride was added by portions in a nitrogen atmosphere with caution to prevent a temperature rise of the solution. The reaction was continued for about 20 hours with stirring at room temperature. The polyamic acid thus obtained had an inherent viscosity of 3.21 dl/g. To the solution of polyamic acid obtained, 30.3 g(0.3 mole) of triethylamine and 30.6 g(0.3 mole) of acetic anhydride were added over about 30 minutes and successively stirred for about 30 minutes. The reaction solution thus obtained was charged with 2000 g of methanol. The precipitated powder was filtered, washed with methanol and acetone, and then dried at 300° C. for 8 hours in a nitrogen atmosphere. The amount of polyimide powder thus obtained was 517 g. The yield was 94%. The polyimide obtained was a crystalline resin and had a glass transition temperature of 271° C., melting point of 389° C. and melt viscosity of 5500 poise.

Polyimide 2

The same procedures as described in polyimide 1 were carried out by using 4,4'-bis[4-(3-aminophenoxy)-phenyl]-1,1,1,3,3,3-hexafluoropropane and pyromellitic dianhydride. The polyimide obtained was a crystalline resin and had a glass transition temperature of 247° C., melting point of 385° C. and melt viscosity of 4800 poise.

Polyimides 3-15

The same procedures as described in polyimide 1 were carried out using various combinations of aromatic tetracarboxylic dianhydrides and aromatic diamines as illustrated in Table 1. The glass transition temperature, melting point and melt viscosity of the polyimides thus obtained are illustrated in Table 1.

EXAMPLE 1

Polyimide powder 1 was dried at 150° C. for 24 hours. The moisture content of the polyimide powder was 180 ppm. The polyimide powder was fed through a screw compactor to an extruder having a diameter of 15 mm and L/D ratio of 22, and heat-melted at 420° C.

A 20 AWG silver plated copper wire was previously heated to 200° C. and fed to a crosshead die.

The take-off speed of the copper wire was adjusted so as to obtain a thickness of the insulator layer of about 0.2 mm. The take-off speed in the operation was 1 m/min. The covered wire extruded out the die was allowed to cool. The insulated wire thus obtained was excellent in thermal resistance. Extrusion conditions and properties of the insulated wire are illustrated in Table 2.

EXAMPLE 2

Polyimide powder 2 was dried at 150° C. for 24 hours. The moisture content of the polyimide powder was 200 ppm. The polyimide powder was fed through a screw compactor to an extruder having a diameter of 15 mm and L/D ratio of 22, and heat-melted at 400° C. Fused resins was extruded through a nozzle having an internal diameter of 2 mm at a rate of 186 g/h, allowed to cool and cut into pellets of about 3 mm in length. The pellets were extruded by the same procedures as described in Example 1.

TABLE 1

| Polyimide No. | Aromatic tetracarboxylic anhydride | Aromatic diamine | Glass transition temperature °C. | Melt Viscosity poise |
|---|---|---|---|---|
| 3 | pyromellitic dianhydride, | bis[4-(3-aminophenoxy)phenyl]-sulfide | 218 | 2800 |
| 4 | 3,3',4,4'-biphenyltetracarboxylic dianhydride, | bis[4-(3-aminophenoxy)phenyl]-sulfone | 248 | 4500 |
| 5 | 3,3',4,4'-biphenyltetracarboxylic dianhydride, | bis[4-(3-aminophenoxy)phenyl]-ketone, | 229 | 4000 |
| 6 | 3,3',4,4'-biphenyltetracarboxylic dianhydride, | 2,2-bis[4-(4-aminophenoxy)-phenyl]propane | 210 | 3000 |
| 7 | 3,3',4,4'-benzophenonetetracarboxylic dianhydride, | bis[4-(3-aminophenoxy)phenyl]-sulfone | 238 | 2400 |
| 8 | 3,3',4,4'-benzophenonetetracarboxylic dianhydride, | 2,2-bis[4-(3-aminophenoxy)phenyl]-1,1,1,3,3,3-hexafluropropane, | 206 | 3400 |
| 9 | 3,3',4,4'-benzophenonetetracarboxylic dianhydride | 2,2-bis[4-(3-aminophenoxy)-phenyl]propane | 207 | 2200 |
| 10 | bis(3,4-dicarboxyphenyl)-ether dianhydride | 4,4'-bis(3-aminophenoxy)-biphenyl | 208 | 3900 |
| 11 | bis(3,4-dicarboxyphenyl)-ether dianhydride | bis[4-(3-aminophenoxy)phenyl]-ketone, | 202 | 2800 |
| 12 | bis(3,4-dicarboxyphenyl)-ether dianhydride, | bis[4-(3-aminophenoxy)phenyl]-sulfide | 175 | 2000 |

TABLE 1-continued

| Polyimide No. | Aromatic tetracarboxylic anhydride | Aromatic diamine | Glass transition temperature °C. | Melt Viscosity poise |
|---|---|---|---|---|
| 13 | 4,4'-(p-phenylenedioxy)-diphthalic dianhydride, | bis[4-(3-aminophenoxy)phenyl]-sulfone | 209 | 2600 |
| 14 | 4,4'-(p-phenylenedioxy)-diphthalic dianhydride, | bis[4-(3-aminophenoxy)phenyl]-ketone, | 195 | 2500 |
| 15 | 4,4'-(p-phenylenedioxy)-diphthalic dianhydride, | 2,2-bis[4-(3-aminophenoxy)-phenyl]propane | 176 | 2300 |

The insulated wire thus obtained was satisfactory in appearance and excellent in thermal resistance. Physical properties of the insulated wire are illustrated in Table 2.

EXAMPLES 3-15

Polyimide powders 3-15 were melt-extruded by the same procedures as described in Example 1. The insulated wires thus obtained were satisfactory in appearance and excellent in thermal resistance. Extrusion conditions and properties of the insulated wire are illustrated in Table 2.

COMPARATIVE EXAMPLE 1

Polyimide powder 1 was melt-extruded by the same procedures as described in Example 1 except that the extrusion temperature was 460° C. However, bubbles and residual foreign matter were generated in the covering layer of the wire thus obtained as a result of decomposition of the resin. The surface appearance of the insulated wire was hence extremely poor.

COMPARATIVE EXAMPLE 2

Polyimide powder 1 was dried at 90° C. for 5 hours. The moisture content of the polyimide powder was 300 ppm. This polyimide powder 2 was melt-extruded by the same procedures as described in Example 1. Bubbles generated in the covering layer of the wire. The surface appearance of the insulated wire was hence extremely poor.

COMPARATIVE EXAMPLE 3

Polyimide powder 2 was melt-extruded by the same procedures as described in Example 2 except that the extrusion temperature was 470° C. Bubbles and residual foreign matter were generated in the covering layer of the wire thus obtained as a result of decomposition of the resin. The surface appearance of the insulated wire was hence extremely poor.

COMPARATIVE EXAMPLE 4

Polyimide powder 7 was melt-extruded by the same procedures as described in Example 1 except that extrusion temperature was 290° C. However, extrusion could not be carried out.

TABLE 2

| Example or comparative example | Polyimide powder No. | Moisture content (ppm) | extrusion temperature (°C.) | Extrudability | Surface appearance of insulated wire | Dielectric strength in water (kV) |
|---|---|---|---|---|---|---|
| Exa. 1 | 1 | 180 | 420 | Good | Good | 20 |
| Comp. Exa. 1 | 1 | " | 460 | Decomposition | Poor | 9 |
| Comp. Exa. 2 | 1 | 300 | 400 | Poor | Poor | 18 |
| Exa. 2 | 2 | 200 | 400 | Good | Good | 18 |
| Comp. Exa. 3 | 2 | " | 470 | Decomposition | Poor | 5 |
| Exa. 3 | 3 | 150 | 360 | Good | Good | 15 |
| Exa. 4 | 4 | 180 | 380 | " | " | 17 |
| Exa. 5 | 5 | 200 | 360 | " | " | 23 |
| Exa. 6 | 6 | 100 | 350 | " | " | 25 |
| Exa. 7 | 7 | 50 | 340 | " | " | 18 |
| Comp. Exa. 4 | 7 | " | 290 | impossible | — | — |
| Exa. 8 | 8 | 150 | 360 | Good | Good | 17 |
| Exa. 9 | 9 | 180 | 350 | " | " | 20 |
| Exa. 10 | 10 | 130 | 350 | " | " | 19 |
| Exa. 11 | 11 | 160 | 350 | " | " | 18 |
| Exa. 12 | 12 | 80 | 300 | " | " | 23 |
| Exa. 13 | 13 | 100 | 350 | " | " | 24 |
| Exa. 14 | 14 | 120 | " | " | " | 17 |
| Exa. 15 | 15 | 180 | 300 | " | " | 21 |

What is claimed is:

1. A process for preparing an insulated wire comprising heat-melting a polyimide having recurring structural units represented by formula (I)

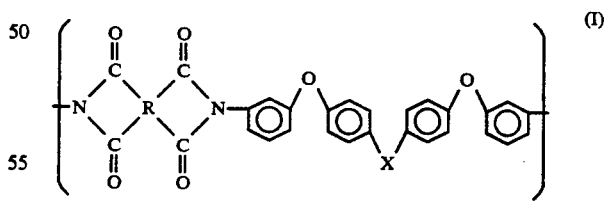

wherein R is a tetravalent radical selected from the group consisting of an aliphatic radical having two or more carbon atoms, a cyclo-aliphatic radical, a monoaromatic radical, a condensed polyaromatic radical and a non-condensed polyaromatic racial wherein the aromatic radicals are mutually connected with a bond or a crosslinking function, X is a divalent radical of a single bond, sulfur atom, sulfonyl radical, carbonyl radical, isopropylidene radical or hexafluoroisopropylidene radical in a temperature range of 300° C. to 450° C. in melt-extrusion process, covering a conductor and cooling to solidify said polyimide to form insulation for said wire.

2. The process of claim 1, wherein the moisture content of the polyimide is 200 m by weight or less.

3. The process of claim 1 wherein the polyimide is heat melted in the temperature range of 350° to 430° C.

4. The process of claim 1 wherein the conductor is a metal or alloy having a specific resistance of $20 \times 10^{-6}$ Ωcm or less.

5. The process of claim 1 wherein the conductor is coated with tin, zinc, nickel, silver, aluminum, solder or copper and the polyimide is melt extruded over the coated conductor.

6. The process of claim 4 wherein the conductor is coated with nickel.

7. The process of claim 4 wherein the conductor is coated with silver.

8. The process of claim 1 wherein the conductor is aluminum.

9. The process of claim 1 wherein the conductor is copper.

10. The process of claim 1 wherein the polyimide is melt extruded to a thickness of 0.01 to 5 mm.

11. The process of claim 1 wherein the polyimide has recurring structural units of represented by the formula:

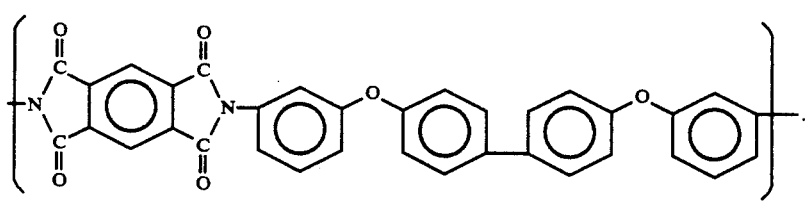

* * * * *

UNITED STATES PATENT AND TRADEMARK OFFICE
CERTIFICATE OF CORRECTION

PATENT NO. : 5,233,011

DATED : August 3, 1993

INVENTOR(S) : Saruwatari et al

It is certified that error appears in the above-identified patent and that said Letters Patent is hereby corrected as shown below:

Title Page:
In the Abstract, line 3 of that text, "condutor" should be --conductor--.

Claim 1, line 62, column 8, "racial" should be --radical--.

Column 1, lines 26-27, amend "UBILEX" to --UPILEX--.

Signed and Sealed this

Seventh Day of June, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,233,011
DATED : August 3, 1993
INVENTOR(S) : Saruwatari et al

It is certified that error appears in the above-identified patent and that said Letters Patent is hereby corrected as shown below:

Title Page:
In the Abstract, line 3 of that text, "condutor" should be --conductor--.

Claim 1, line 62, column 8, "racial" should be --radical--.

Claim 2, line 4, column 9, "200m" should be --200ppm--.

Column 1, lines 26-27, amend "UBILEX" to --UPILEX--.

This certificate supersedes Certificate of Correction issued June 7, 1994

Signed and Sealed this

Twenty-fifth Day of October, 1994

Attest:

BRUCE LEHMAN

Attesting Officer

Commissioner of Patents and Trademarks